(12) United States Patent
Prytkov et al.

(10) Patent No.: US 8,164,446 B2
(45) Date of Patent: Apr. 24, 2012

(54) METHOD AND DEVICE FOR DETECTING FAKE SKIN PRINTS

(75) Inventors: Anton Prytkov, Grugliasco (IT);
Andrey Bachurinskiy, Grugliasco (IT);
Alexander Skripalshchikov, Grugliasco (IT)

(73) Assignee: Green Bit S.p.A., Grugliasco (Turin) (IT)

( * ) Notice: Subject to any disclaimer, the term of this patent is extended or adjusted under 35 U.S.C. 154(b) by 406 days.

(21) Appl. No.: 12/473,644

(22) Filed: May 28, 2009

(65) Prior Publication Data

US 2009/0295574 A1    Dec. 3, 2009

(30) Foreign Application Priority Data

May 30, 2008    (IT) .............................. TO2008A0418

(51) Int. Cl.
*G08B 21/00*    (2006.01)

(52) U.S. Cl. ...... 340/540; 340/541; 340/5.53; 340/5.83; 340/10.42; 340/635; 382/115; 382/122; 382/124; 382/125

(58) Field of Classification Search .................. 340/540, 340/541, 5.53, 5.83, 10.42, 635; 382/115, 382/122, 124, 125
See application file for complete search history.

(56) References Cited

U.S. PATENT DOCUMENTS

| | | | | |
|---|---|---|---|---|
| 5,974,162 | A | * | 10/1999 | Metz et al. ................... 382/124 |
| 7,349,561 | B2 | * | 3/2008 | Hata ............................ 382/124 |
| 2002/0131624 | A1 | | 9/2002 | Shapiro et al. |
| 2003/0169901 | A1 | | 9/2003 | Pavlidis et al. |

OTHER PUBLICATIONS

European Search Report issued Oct. 25, 2011 in connection with EP App No. 09161200.2.
Antonelli, A., et al, "*IEEE Transactions on Information Forensics and Security*", vol. 1, No. 3, Sep. 2006, pp. 360-373, "Fake Finger Detection by Skin Distortion Analysis.", XP 55007996.

* cited by examiner

*Primary Examiner* — Tai T Nguyen
(74) *Attorney, Agent, or Firm* — Nixon & Vanderhye P.C.

(57) ABSTRACT

The method aims at identifying a fake element (F1) reproducing a fake skin print positioned on the detection surface (13) of an optical device for detecting skin prints such as fingerprints. The method provides for sending (14) towards the abovementioned detection surface (13) an illumination beam (14) to be back-scattered and propagate through the fake element (F1) bearing the fake print. The beam in question is a shielded beam including an illuminated region (22) and a shielded region (23). A sensor (16) captures the shielded illumination beam after the back-scattering, generating a signal indicating the dimension ($x_0$, $x_0'$) of the transition region (24) between the illuminated region (22) and the shielded region (23) present in the shielded beam after the back-scattering. The possible presence of a fake element (F1) reproducing a fake skin print is identified when the abovementioned transition region (24) has a dimension larger than a given reference value ($x_0$).

17 Claims, 2 Drawing Sheets

METHOD AND DEVICE FOR DETECTING FAKE SKIN PRINTS

Figure 1:
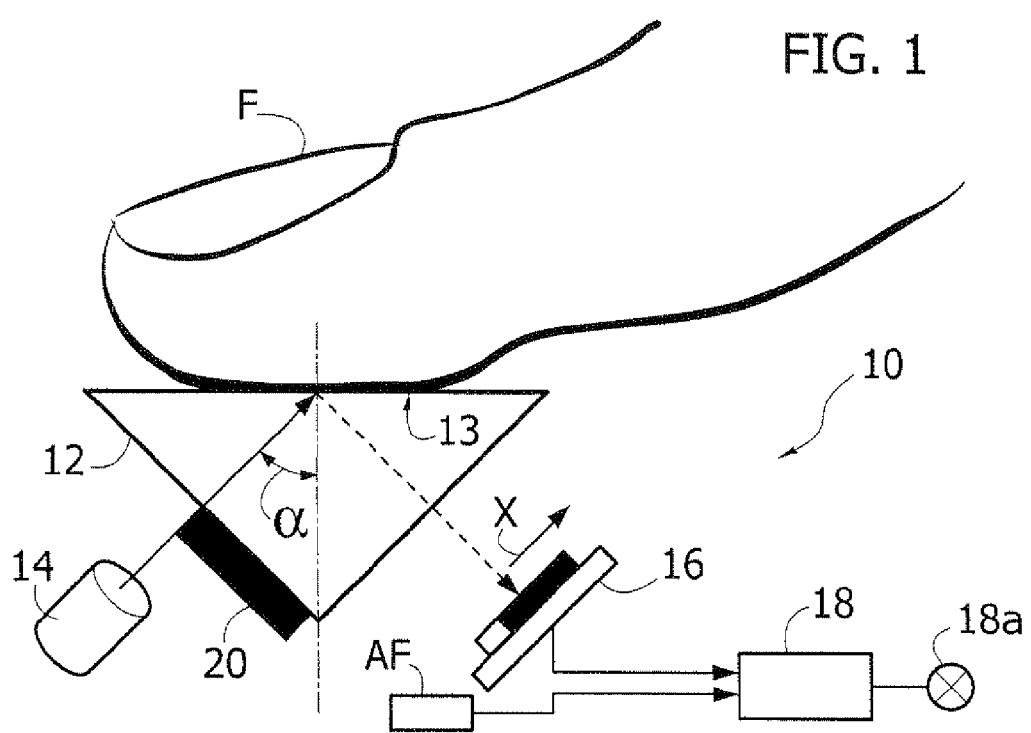

This application claims priority to Italian Patent Application No. TO2008A000418 filed 30 May 2008, the entire contents of which is hereby incorporated by reference.

FIELD OF THE INVENTION

The present description refers to techniques for detecting skin prints.

The term "skin print" is herein used to indicate prints such as, for example, fingerprints, palm prints or heel prints of the hand and, in general, all skin prints adapted to be used as biometric images, for example for identification purposes.

DESCRIPTION OF THE RELATED ART

Conventional techniques for detecting fingerprints (or other skin prints), based on the criterion of applying the skin portion from which the prints are meant to be taken on an inking buffer and then pressing a corresponding image on a paper surface, tend to be more commonly replaced by optical detection techniques (scanning): these techniques also allow using the skin prints as an identification "code" in applications such as access control, actuation of automatisms of various types, etc.

Such methods for detecting fingerprints provide for that one or more fingers, the palm or the heel of a hand be positioned on an optical plate or platen having an illuminated detection surface having a source of light located in proximity to the optical plate. An optical sensor, also located in proximity to the detection surface, captures the back-reflected or back-scattered radiation of the detection surface. The analysis of the signal produced by the sensor allows identifying the development of the ridges and valleys characteristic of the skin print. Depending on the detection mechanism used (for example as a function on the angle at which the illumination and/or radiation capturing operation was performed) the abovementioned ridges appear as dark regions on a white background or as white regions on a dark background whose development can be analysed. Documents EP-A-0 617 919 and EP-A-0 749 612 generally represent these techniques.

Regardless of their operation mechanism, the abovementioned optical devices may be deceived by fake prints, i.e. by fake elements capable of reproducing a taken skin print, for example, through casting or taking a print left on an object. These fake prints may be used improperly, for example to allow a non-authorised person to activate a given apparatus (such as for example a mechanism for opening a door to enter a reserved area) using a fake print taken from an authorised person.

Thus a series of anti-fake solutions aimed at revealing such improper attempts has been developed. These techniques are represented, for example, by document WO-A-03/027941, based on the use of a double light source, or document WO-A-07/009016.

Particularly subtle and difficult to detect are the deceitful techniques that provide for applying a transparent material film, such as silicone or gelatine on a skin surface, such as for example an "authentic" fingertip, reproducing a fake skin print.

As a matter of fact, due to the transparency of the film, these fake prints may be invisible to the scanning device, which may thus be led to interpreting the fingerprint represented by the "fake finger" as the authentic fingerprint.

OBJECT AND SUMMARY OF THE INVENTION

In the general framework outlined above there arises the need to provide solutions capable of detecting these attempts to deceive in a reliable manner.

The present invention has the object of providing such solution.

According to the present invention, such object is attained due to a method having the characteristics specifically referred to in the claims hereinafter. The invention also regards a corresponding device.

The claims form an integral part of the technical disclosure provided herein in relation to the invention.

BRIEF DESCRIPTION OF THE ATTACHED DRAWINGS

Figure 2:
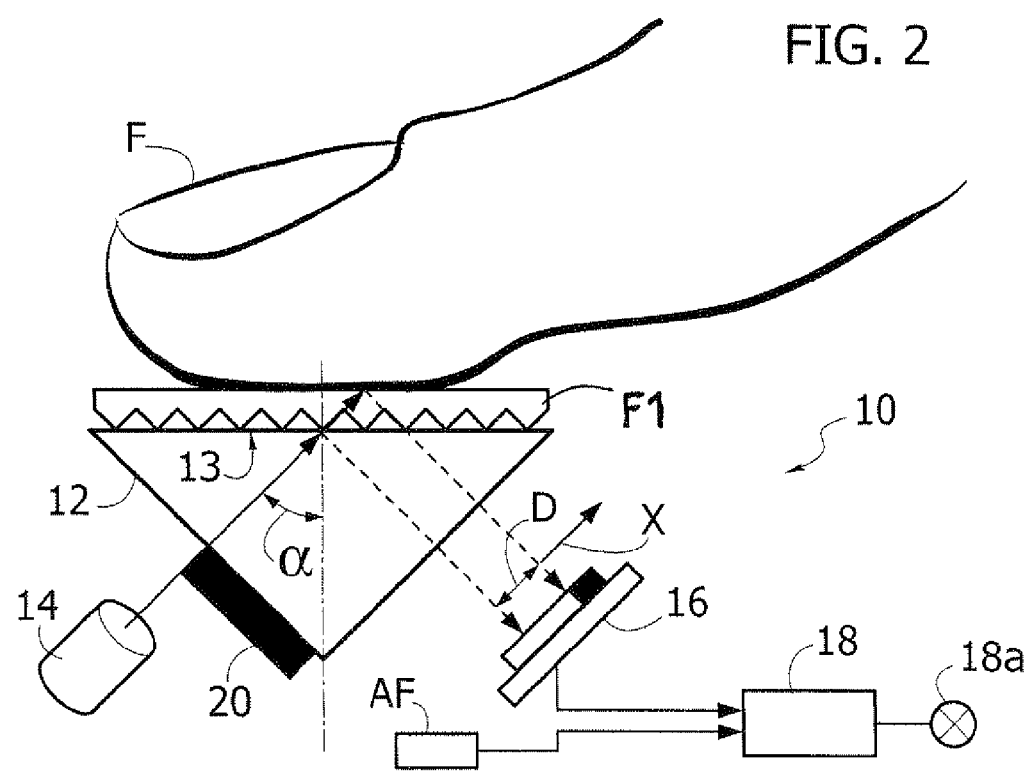
Figure 3:
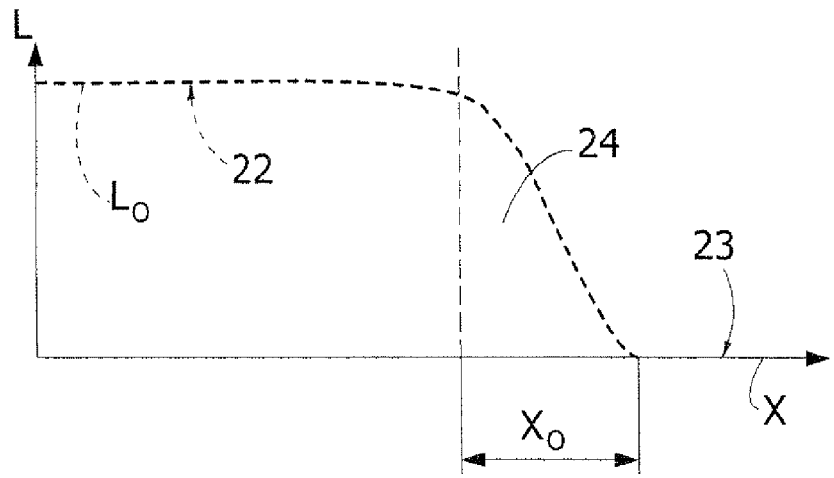
Figure 4:
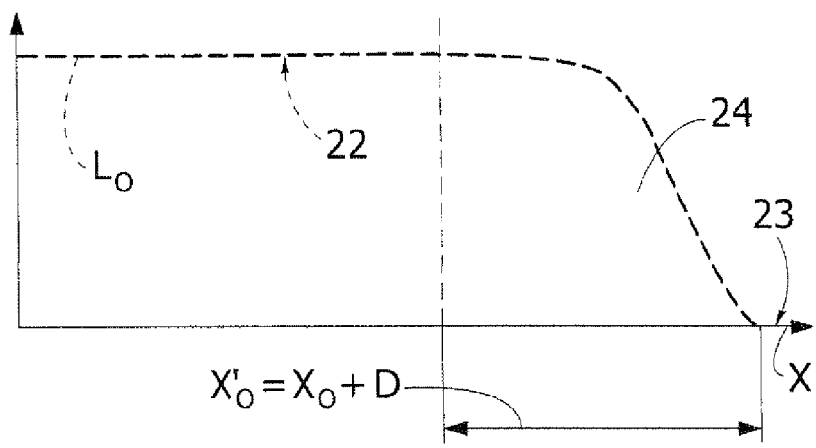

Now, the invention shall be described, strictly provided for exemplifying and non-limiting purposes, with reference to the attached drawings, wherein:

FIGS. 1 and 2 schematically represent a device according to the solution described herein, and FIGS. 3 and 4 are two diagrams illustrating operation of the system represented in FIGS. 1 and 2.

DETAILED DESCRIPTION OF THE EMBODIMENTS

Illustrated in the following description are various specific details aimed at an in-depth understanding of the embodiments. The embodiments may be obtained without one or more specific details, or through other methods, components, materials etc. In other cases, known structures, materials or operations are not shown or described in detail to avoid obscuring the various aspects of the embodiments.

Reference to "an embodiment" in this description indicates that a particular configuration, structure or characteristic described regarding the embodiment is included in at least one embodiment. Hence, expressions such as "in an embodiment", possibly present in various parts of this description do not necessarily refer to the same embodiment. Furthermore, particular configurations, structures or characteristics may be combined in any suitable manner in one or more embodiments.

References herein are used for facilitating the reader and thus they do not define the scope of protection or the range of the embodiments.

In FIGS. 1 and 2 reference 10 indicates a device susceptible to be associated to an optical scanning system for detecting skin prints (for the sake of simplicity, reference shall be made to detection of fingerprints in the present invention hereinafter) in order to reveal attempts to "deceive" such system by positioning—on the detection surface of the system—a body bearing a fake element (for example a transparent film) that generally reproduces a fake skin print.

In the embodiment illustrated herein, the anti-fake device 10 is substantially independent of the detection system intended to be protected against attempts to deceive. Such detection system may thus base its operation on any known solution (reflection/scattering) and be obtained according to a wide range of possible implementation variants, to be deemed generally known and thus such not to require a detailed description herein; the abovementioned characteristics are not per se decisive for the understanding and implementation of the solution of the anti-fake device described herein.

In the embodiment illustrated herein, it is assumed that the device 10 and the optical detection system the it defends against fake prints have in common a prism 12 made of transparent material (for example acrylic plastic).

The prism 12 defines a detection surface 13 on which—under regular use conditions referred to in FIG. 1—a finger F, for example, whose fingerprints are meant to be detected is supposed to be positioned.

FIG. 2 instead refers to a possible attempt to deceive the detection system, by positioning—on the detection surface 13 of the prism 12—a "fake finger", i.e. for example, an "authentic" finger F applied on which is a film F1 reproducing the development of the ridges and of the valleys of a fingerprint different from that of the finger F, i.e. a fake fingerprint.

The attempt to deceive may for example be performed, by a person not authorised to enter a given security area, i.e. a person who, by placing his finger F on the detection surface 13 of the system, would be identified as non-authorised through the fingerprint. The same person may thus try to capture (for example through a cast) the fingerprints of an authorised person, reproduce the print thus captured on the film F1 and then apply such film on his finger and then try to deceive the system pretending to be the authorised person whose fingerprint had been captured.

A light source 14 projects towards the detection surface 13, according to an angle α with respect to normal N at the surface 13 itself, an illumination radiation beam susceptible to be back-scattered (by the body F) and propagate through the fake element F1, that is transparent to the radiation of the source 14.

The source 14 may emit a wavelength included, for example, in the range between 380 and 750 nanometers. In an embodiment, the radiation emitted by the source 14 has a wavelength in the range between 400 and 420 nanometers. This choice is such that the scattering of the light by the skin and by the skin tissue is minimum.

It is also clear that the solution described herein is not limited to the use of an illumination radiation whose wavelength falls in the range of the visible region. Likewise, while for example in the embodiment illustrated herein the source 14 is positioned in such a manner to illuminate the surface 13 through one of the faces corresponding to the cathetus of the section profile of the prism 12, the source could be positioned at one of the end triangular faces of the prism 12 itself.

A sensor 16 arranged at a symmetric position with respect to the light source 14 captures the back-scattered radiation coming from the surface 13.

The sensor 16 may be a sensor (for example a CCD) of the linear type, including a linear series of sensitive elements aligned along an axis x, or of the two-dimensional type wherein it is possible to take into account the illumination effect along an axis, which represents the axis x considered herein.

The output signal of the sensor 16 is sent to a processing circuit 18 that serves the function better described hereinafter.

In the embodiment illustrated herein, the device 10 comprises a shield 20 arranged on one of the plates of the prism 12. Obviously, also other arrangements are possible, for example on the radiation source 14 itself.

The shield 20 is made of material capable of absorbing the radiation emitted by the source 14 and ensures that the illumination beam projected by the source 14 towards the surface 13 is shadowed or shielded, in such a manner to comprise an illuminated region and a shielded region (i.e. dark) separated from each other by a distinct separation line, corresponding to the edge line of the shield 20.

Comparison of FIGS. 1 and 2 is intended to highlight the different behaviour of the device 10 in cases wherein positioned on the surface 13 is an "authentic" finger F (FIG. 1) or a "fake" finger (FIG. 2), i.e. a finger F bearing a fake element made of transparent material F1 that reproduces the development of ridges and valleys of a fingerprint intended to be used to deceive the device 10, for example to allow a non-authorised person to enter a determined area using a fake fingerprint captured from an authorised person.

In the embodiment represented herein, the operation of the device 10 is based on the fact of detecting the alteration of the radiation path of the source 14 caused by the presence of the fake element F1.

In the case represented in FIG. 1, i.e. under normal operation, when only an authentic finger F is present applied in direct contact with the surface 13, the beam of the source 14 penetrates into the skin of the finger F in the entire illuminated region and it is back-scattered towards the sensor 16 by the external layers of the skin of the finger F itself.

Supposing (as it is reasonably possible, in particular regarding wavelengths between 400-420 nanometers) that the amount of radiation scattered in the skin of the finger F at contact with the surface 13 is not particularly significant, the length of penetration of the radiation at the shielded region may be considered actually negligible.

Hence, in the conditions represented in FIG. 1, the signal produced by the sensor 16 shall have a development (referring to the axis x mentioned previously) like the one represented in FIG. 3, wherein distinguished are:

an illuminated region (not shielded, thus clear) 22, where the intensity of the luminosity signal L detected by the sensor 16 reaches a maximum value $L_0$;

a shielded region (dark) 23, where the intensity of the luminosity signal L detected by the sensor 16 reaches a practically null value; and a transition region 24, where the intensity of the luminosity signal L detected by the sensor 16 drops from value $L_0$ to a practically null value in a range of values $x_0$ defining the dimension of the transition region 24.

Should a "fake finger" F bearing a fake element F1 imitating a fake fingerprint (see FIG. 2) be applied on the detection surface 13 the radiation of the source 14 penetrates to a given length into the fake element F1, before reaching the skin of the finger F. The back-scattering effect towards the sensor 16 at the base of the detection action shall thus start occurring only where the radiation actually reaches the skin of the authentic finger F.

Hence, in presence of a fake finger F+F1, the signal detected by the sensor 16 shall have the development like the one represented in FIG. 4.

Generally, this development is not different from the development represented in FIG. 3 save for the fact that the transition region 24 between the illuminated region 22 and the shielded region 23 shall have a dimension or width $x_0'$ equivalent to $x_0+D$, i.e. a dimension larger than a total D about equivalent to the length of the propagation path of the radiation of the source 14 inside the fake element F1.

Obviously, the value D is proportional to the illumination angle α, in the sense that—considering other parameters (for example the thickness of the fake element F1)—the value D grows proportionally to the increase of the angle α. Such angle may be selected freely, independently from the Frustrated Total Internal Reflection (FTIR) of the prism 12.

The processing circuit 18 is configured to store—in the circuit itself 18—a reference value equivalent to value $x_0$, i.e. the value of the dimension of the transition region 24 under normal conditions of use of the system for detecting prints, i.e. when an authentic finger is positioned on the surface 13, in other words positioning an authentic skin print F at direct contact with the detection surface 13.

The value $x_0$ may be determined, for example, through a cycle of successive detections, carried out for example using different fingers/prints, thus storing the mean value measured in the successive detections as the reference value of $x_0$.

Usually, regardless of how it is obtained, the value $x_0$ may be definitely determined for a given type of device 10 and then simply entered as programming data in the processing circuit 18 of analogous devices, thus avoiding performing a calibration cycle for each device 10.

The circuit 18 is programmed in such a manner to be capable of revealing the fact that the signal generated by the sensor 16 reveals a value of the dimension of the transition zone 24 larger than the reference value $x_0$, and emit a corresponding signal indicating an attempt to deceive.

This signal may possibly be represented by an explicit warning signal such as the lighting up or a warning light 18*a*.

In some embodiments, the abovementioned signal indicating an attempt to deceive is used for more complex processing operations alongside homologous signals possibly emitted by other anti-fake devices AF operating according to different principles (for example devices capable of detecting opaque or non-transparent fake elements). All this so as to be able to process a more articulated framework regarding an attempt to deceive carried out and/or create an integrated anti-fake system capable of detecting different types of attempts to deceive.

The signal indicating an attempt to deceive may also block the operation of an automatism possibly controlled by the prints detection system. This in such a manner to ensure that alongside being signalled, the attempt to deceive is thwarted in any case.

Usually, the circuit 18 is programmed in such a manner to emit the signal indicating an attempt to deceive when the signal generated by the sensor 16 reveals a value of dimension of the transition region 24 larger than the reference value $x_0$ increased by a given threshold tolerance B selected in such a manner to avoid emission of false alarms due to minimal accidental variations of the dimension of the transition region 24.

Thus, as already mentioned previously, the operation principle of the device 10 described herein does not depend on the specific mechanism of operation of the optical system for detecting prints protected by the device 10 serving as an anti-fake device.

Obviously, without prejudice to the underlying principle of the invention, the details and embodiments may vary, even significantly, with respect to what has been described herein by way of non-limiting example only, without departing from the scope of the invention as defined by the claims that follow. Once again, it should be borne in mind that the solution described herein strictly for exemplifying purposes with reference to detecting fingerprints is suitable to be generally applied to detecting skin prints of any kind.

The invention claimed is:

1. A method of identifying a fake element reproducing a fake skin print positioned on a detection surface of an optical device for detecting skin prints, the method comprising:
    sending towards said detection surface an illumination beam to be back-scattered and propagate through said fake element, said illumination beam being a shielded beam including an illuminated region and a shielded region,
    capturing a shielded illumination beam after the back-scattering, wherein, after back-scattering, said shielded illumination beam includes an illuminated region and a shielded region separated by a transition region,
    generating signal indicating a dimension ($x_0$, $x_0'$) of said transition region, and
    identifying a possible presence of said fake element reproducing said fake skin print when said transition region has a dimension larger than a given reference value ($x_0$).

2. Method according to claim 1 including the operation of identifying the possible presence of said fake element reproducing said fake skin print when said transition region has a dimension larger than a given reference value ($x_0$) increased by a tolerance threshold.

3. Method according to claim 1, wherein said given reference value ($x_0$) is determined as a value of the dimension of said transition region detectable by positioning an authentic skin print at direct contact with said detection surface.

4. Method according to claim 3, wherein said given reference value ($x_0$) is determined as a mean value of said transition region detectable by positioning a plurality of authentic skin prints in succession at direct contact with said detection surface.

5. Method according to claim 3, wherein said given reference value ($x_0$) is determined once and then stored in a plurality of revealing devices.

6. Method according to claim 1, including an operation of emitting a signal to indicate an attempt to deceive upon identification of the possible presence of said fake element.

7. Method according to claim 1, including the operation of generating said shielded illumination beam by interposing an absorbent shield on a propagation path of said illumination beam towards said detection surface.

8. Method according to claim 1, wherein said illumination beam has a wavelength included between 380 and 750 nanometers.

9. Method according to claim 1, wherein said illumination beam has a wavelength included between 400 and 420 nanometers.

10. Device for identifying a fake element reproducing a fake skin print positioned on a detection surface of an optical device for detecting skin prints, the device including:
    a light source for sending towards said detection surface an illumination beam to be back-scattered and propagate through said fake element said light source being coupled to a shield to make said illumination beam a shielded beam including an illuminated region and a shielded region,
    a sensor for capturing a shielded illumination beam after the back-scattering, wherein, after back-scattering said shielded illumination beam includes an illuminated region and a shielded region separated by a transition region, said sensor being susceptible to generate a signal indicating a dimension ($x_0$, $x_0'$) of said transition region, and
    a processing circuit sensitive to said signal indicating the dimension ($x_0$, $x_0'$) of said transition region and configured to identify a possible presence of said fake element reproducing said fake skin print when said transition region has a dimension larger than a given reference value ($x_0$).

11. Device according to claim 10, wherein said processing circuit is configured to identify the possible presence of a said fake element reproducing a fake skin print when said transition region has a dimension larger than a given reference value ($x_0$) increased by a tolerance threshold.

12. Device according to claim 10, wherein said processing circuit is configured to store said given reference value ($x_0$) identified as a value of the dimension of said transition region detectable by positioning an authentic skin print at direct contact with said detection surface.

13. Device according to claim 12, wherein said processing circuit is configured to store said given reference value ($x_0$) received as programming data.

14. Device according to claim 10, including a prism having a face defining said detection surface and another face bearing said shield to make said illumination beam a shielded beam.

15. Device according to claim 14, wherein said other face is a lateral face or an end face of said prism.

16. Device according to claim 9, wherein said light source has a wavelength included between 380 and 750 nanometers.

17. Device according to claim 10, wherein said light source has a wavelength included between 400 and 420 nanometers.

* * * * *